Aug. 10, 1965  F. W. SHIREY  3,199,770
LUBRICATING OIL PRESSURE CONTROL APPARATUS
FOR UNLOADING COMPRESSORS
Filed July 30, 1963  2 Sheets-Sheet 1

INVENTOR.
FRANK W. SHIREY
BY
*A. A. Steinmiller*
ATTORNEY

Aug. 10, 1965     F. W. SHIREY     3,199,770
LUBRICATING OIL PRESSURE CONTROL APPARATUS
FOR UNLOADING COMPRESSORS
Filed July 30, 1963     2 Sheets-Sheet 2

INVENTOR.
FRANK W. SHIREY
BY A. A. Steinmiller
ATTORNEY

United States Patent Office 3,199,7[?]
Patented Aug. 10, 19[??]

3,199,770
LUBRICATING OIL PRESSURE CONTROL APPARATUS FOR UNLOADING COMPRESSORS
Frank W. Shirey, Irwin, Pa., assignor to Westinghouse Air Brake Company, a corporation of Pennsylvania
Filed July 30, 1963, Ser. No. 298,736
4 Claims. (Cl. 230—27)

This invention relates to compressor unloading devices, and particularly to compressor unloading devices operated by the pressure of the fluid lubricant supplied to the bearings of the compressor.

In Patent No. 2,110,720 issued March 8, 1938 to Philip L. Crittenden and assigned to the assignee of the present application, there is disclosed and claimed a compressor unloading mechanism wherein a lever pivoted at one end and subject at its opposite end to lubricant pressure controlled by the speed of the compressor rocks the lever in the direction to effect operation of an unloading valve into seating contact with a corresponding valve seat located at one end of a passageway and pipe the opposite end of which opens into the air compressing chamber, there being a spring biased valve disposed in this pipe and passageway adjacent the compressing chamber and opening in the direction to establish flow from the compressing chamber to the pipe.

The construction shown in the Crittenden patent is subject to the disadvantage that air under pressure in the pipe and passageway extending between the spring biased valve and the unloading valve is compressible so that when the compressor is operating loaded the air compressed on the compression stroke effects unseating of the spring biased valve at or just prior to the compressor piston reaching its top dead center position. Subsequently, when the piston begins its suction stroke, the spring biased valve is reseated by the air under pressure in the pipe and passageway extending between the spring biased valve and the unloading valve. Consequently, this rapid unseating and reseating of the spring biased valve while the compressor is operating loaded, causes hammering or chattering of this valve upon its seat, which produces rapid wear of both the valve and its valve seat.

Accordingly, it is the general purpose of this invention to provide a novel compressor unloading device of the hydraulic type in which the spring-biased valve shown in the above-mentioned Crittenden patent is eliminated thereby eliminating the chattering experienced with this valve. The novel compressor unloading device of the present invention comprises a lubricant pressure actuated unloader valve located in the cylinder wall adjacent the upper end of the air compressing cylinder of the compressor and operable in response to variations in the pressure of lubricant supplied by a compressor-driven lubricant pump to effect loading of the compressor only after the compressor has attained a chosen speed and unloading of the compressor upon a reduction in lubricant pressure below the pressure corresponding to this chosen speed. By thus locating the unloader valve closely adjacent the air compressing cylinder of the compressor and actuating it by an incompressible fluid, such as the compressor lubricant, the above-mentioned difficulties experienced with the structure shown in the Crittenden patent are eliminated.

More specifically, this invention comprises a compressor unloading device in which lubricant under pressure supplied by a compressor-driven lubricant pump actuates a movable abutment, which may be in the form of a bellows or a piston, to effect seating of a spring biased unloader valve to close a communication extending between an air compressing chamber and atmosphere via the cylinder wall of the compressor thereby loading the compressor only upon the lubricant pressure exceed a chosen value. Consequently, upon a reduction in lubricant pressure below the above-mentioned cho[?] value, as a result of stoppage of the compressor-dri[?] lubricant pump or loss of lubricant pressure from [?] cause, the air compressing chamber is connected direc[?] to atmosphere through a comparatively short passagev[?] which offers a minimum restriction to the flow of air and from the compressing chamber while the compres[?] is operating unloaded.

Figure 1:
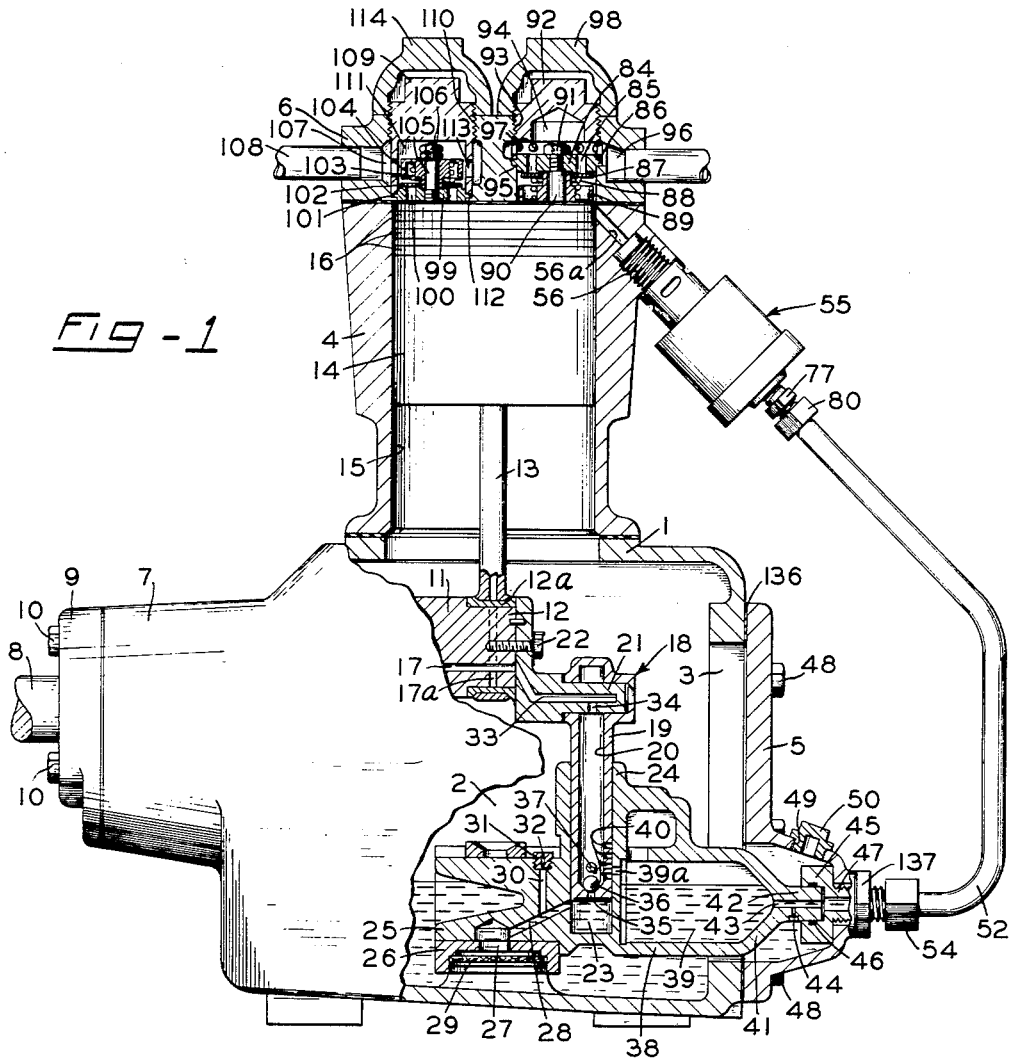
FIG. 1 is a vertical partial cross-sectional view o[?] single stage compressor which embodies the invention
Figure 2:
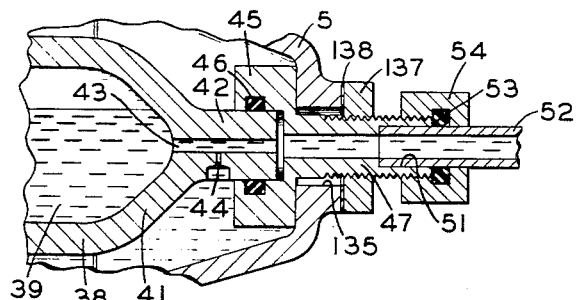
FIG. 2 is a vertical cross-sectional view, at an [en]larged scale, of a portion of the body of the lubric[ant] pump of the compressor of FIG. 1 showing the struct[ural] details of the body and how it is connected to the c[om]pressor unloading valve device.
Figure 3:
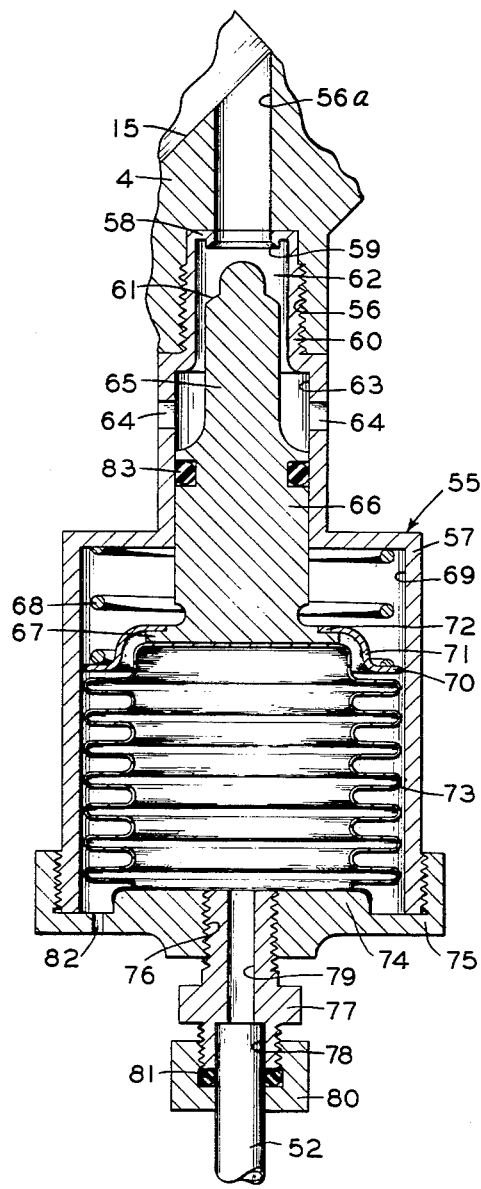
FIG. 3 is a vertical cross-sectional view, at an enlar[?] scale, of the unloading valve device of the compres[sor] of FIG. 1 showing the structual details of this valve [de]vice.

Description—FIGS. 1 to 3

In FIG. 1, the compressor shown, comprises a s[ec]tional casing including a crankcase section 1 enclosin[g a] crankcase chamber 2, and having an open end 3, a c[yl]inder or piston section 4, an end section 5 for clos[ing] the open end 3 of the crankcase section 1, and an in[?]take and discharge valve section or top head 6.

The wall of the crankcase section 1 opposite the [?] opening 3 supports a horizontal tubular journal me[m]ber 7, preferably integrally formed therewith, which closes a bearing chamber having therein suitable a[?] friction bearings (not shown), for supporting a rota[t]a[ble] crankshaft 8. The crankshaft 8 extends exteriorly of [the] jornal member 7, through an opening in a closure me[m]ber 9 that is secured to the end of the journal mem[ber] 7, and to the casing section 1 by means of cap screws bolts 10.

The compressor may be driven by any form of mo[tive] device, such as an electric motor or internal combust[ion] engine, that is operatively connected to the exterior p[or]tion of the crankshaft 8 by means of a pulley wheel [or] gear wheel (not shown) that is secured to the crankshaf[t.]

Any suitable means may be provided for sealing [the] opening in the closure member 9 through which crankshaft 8 extends to prevent fluid lubricant leak[age] therethrough.

The crankshaft 8 is provided with a counter-balan[ce] crank arm 11 having a crank pin 12, to which is connec[ted] in the usual manner, the connecting rod 13 for operat[ing] a compressor piston 14 in a bore 15 of the cylinder so that as the crankshaft 8 is rotated, the piston is recip[ro]cated in the bore. The piston 14 is provided with th[e] piston rings 16 for inhibiting the passage of lubric[ant] from the crankcase chamber 2 to the air compress[ing] chamber above the piston 14.

Connecting rod 13 is provided with a suitable bear[ing] 12a that surrounds the crank pin 12, and fluid lubric[ant] from crankcase chamber 2 is supplied thereto throug[h] passageway 17 and branch passageway 17a, by means [of] reciprocating pump 18 which is operated by rotation [of] the crankshaft 8.

A suitable speed-responsive device (not visible), wh[ich] may be a centrifugally actuated ball valve of the t[ype] shown and described in the hereinbefore-mentio[ned] Patent 2,110,720, is provided for controlling the ou[?]

fluid lubricant from the passageway 17 to vary the pressure of the fluid lubricant as supplied from pump 18. The pump 18 may comprise a tubular piston 19, having a longitudinal bore 20, which piston 19 is pivotally connected at one end to a crank pin 21 secured in eccentric relation to the center of rotation of crankshaft 8 at the end of the crank pin 12 by cap screws 22, only one of which is shown. Upon rotation of the crankshaft 8, piston 19 is reciprocated within a chamber 23 of a piston cylinder 24, which is provided with a trunnion portion 25 pivotally mounted within a bearing member 26 secured to the crankcase section 1, whereby angular movement of the piston cylinder 24 is permitted, in following the movement of the crank pin 21.

Fluid lubricant from crankcase chamber 2 is supplied to the piston chamber 23, at a point immediately below the upper extremity of movement of the piston 19, through a port or opening 27 in the bearing member 26 and a passageway 28 in the trunnion portion 25 connecting the piston chamber 23 and the port 27. A screen 29, which extends across the port 27, prevents the entrance of foreign particles and contaminants into the piston chamber 23.

A bore 30 is provided in the trunnion portion 25 of the piston cylinder 24, which bore 30 connects the passageway 28 to the space in crankcase chamber 2 above the level of the fluid lubricant therein, and a choke plug 31 is screwed into the outer enlarged threaded portion of the bore 30, which plug is provided with a restricted port the purpose of which will be explained hereinafter. The bore 20 of the piston 19 communicates with a passageway 33 in the crank pin 21 through a port 34, the passageway 33 being connected to the passageway in the crank pin 12. An inlet port 35, in the opposite or lower end of the piston 19, connects the bore 20 with the chamber 23, and a ball check valve 36 disposed in the bore 20 of the piston 19 is adapted to seat to permit fluid lubricant to pass from piston chamber 23 into the bore 20 through the port 35, and to close the port 35 and thereby prevent reflux or backflow of fluid lubricant from the bore 20. A pin 37, extending across the piston 19 within the bore 20, serves to limit the extent of the opening movement of the ball check valve 36. The piston cylinder 24 is provided with a horizontally disposed cylindrical extension 38 opposite the trunnion portion 25, in which extension is provided a chamber 39. Communication is established between the chamber 39 in the cylindrical extension 38 and the bore 20 of the piston 19, through a port 39a in the wall of the piston cylinder 24 and a series of ports 40 in the wall of piston 19, the ports 40 being adapted to register successively with the port 39a upon movement of the piston 19.

It will be apparent from the foregoing that upon rotation of the crankshaft 8, the upward stroke of pump piston 19 creates a vacuum or partial vacuum in the piston chamber 23 whereby the static head of the fluid lubricant in the crankcase chamber 2, as well as the air pressure acting down on the surface of the fluid in the crankcase chamber, causes fluid lubricant to be supplied to the piston chamber 23 through the screen 29, port 27, and passageway 28, after the piston 19 uncovers the passageway 28. At the same time, due to the higher pressure of the air in the crankcase chamber 2 above the fluid lubricant therein relative to the partial vacuum in the piston chamber 23, a certain amount of air is admitted to passageway 28 through the choke plug 31, and enters the piston chamber 23 along with the fluid lubricant. The fluid lubricant being supplied through the passageway 28 to the crankcase chamber 2 immediately closes up the port or bore 30 and the air admitted through the plug 31 is trapped in the fluid lubricant admitted to piston chamber 23, so that instead of there being a homogeneous incompressible column of fluid lubricant in the piston chamber, there is a slightly compressible column comprising a mixture of air and fluid lubricant.

The right-hand end of the cylindrical extension 38 is closed by a pressure head 41 formed integral therewith and having a boss 42 with a passageway 43 extending therethrough. The boss 42 is provided with a choke or oil release port 44 through which lubricant may flow from the passageway 43 into the crankcase chamber 2 at a restricted rate.

The boss 42 extends into an adapter fitting 45 that is provided with an internal peripheral annular groove in which is disposed an O-ring seal 46 that surrounds the outer periphery of the boss 42 and makes a seal therewith.

As shown in FIG. 2 the adapter fitting 45 is provided with a threaded portion 47 of reduced diameter that extends through an opening in the end section 5 that is secured to the crankcase section 1 by a plurality of cap screws 48, several of which appear in FIG. 1 of the drawings. The end section 5 is provided with a threaded opening 49 through which the level of the fluid lubricant in the crankcase chamber 2 may be determined, as well as drainage of the fluid lubricant from the crankcase chamber effected, if so desired, a screw plug 50 being provided to close the opening 49.

The threaded portion 47 of the adapter fitting 45 is provided with a counterbore 51 that is coaxial with the passageway 43. One end of a tube 52 extends into the counterbore 51 and abuts the left-hand end thereof. The tube 52 has disposed in surrounding sealing relation therewith an O-ring seal 53 that is disposed in an internal peripheral annular groove formed in a nut 54 that also surrounds the tube 52 and has screw-threaded engagement with the threaded portion 47 of the adapter fitting 45. As the nut 54 is tightened on the threaded portion 47, the O-ring seal 53 is squeezed against the outer periphery of the tube 52 to prevent leakage of the lubricant from the passageway 43 and the counterbore 51 along the outer surface of the tube to atmosphere.

The opposite end of the tube 52 is connected to an unloader valve device 55 which is screw threaded into the outer threaded portion of a counterbore 56 in a wall of the cylinder 4, the counterbore 56 opening through a coaxial bore 56a into the compressing chamber portion of the bore 15 at a point adjacent to the intake and discharge valve casing section or top head 6.

The unloader valve device 55 is shown in detail in FIG. 3 of the drawings and comprises an unloader valve casing member 57. As shown in FIG. 3 of the drawings, the upper end of the unloader valve casing member 57 is provided with an inturned flange 58 on the lower side of which is formed an annular valve seat 59. Adjacent its upper end, the unloader valve casing member 57 is provided with a hollow cylindrical portion 60 having screw threads provided on its peripheral surface for engaging the corresponding screw threads in the counterbore 56.

Disposed within the hollow cylindrical portion 60 of the unloader valve casing member 57 and arranged coaxially with the annular valve seat 59 is preferably a spherical type valve 61 which controls communication between the compressing chamber of the compressor and a chamber 62 in which the spherical type valve 61 is disposed. The chamber 62 in the hollow cylindrical portion 60 opens into a counterbore 63 formed in the unloader valve casing member 57. The wall of the counterbore 63 is provided with a plurality of arcuately spaced-apart ports 64 so that when the spherical type valve 61 occupies the unseated position in which it is shown in FIG. 3 of the drawings, the compression chamber of the compressor is open to the atmosphere via the bore 56a, annular valve seat 59, chamber 62, counterbore 63, and ports 64.

The spherical type valve 61 is connected by a stem 65 to a cylindrical piston member 66 that is slidably mounted in the counterbore 63 and, as shown in FIG. 3, is provided at its lower end with a collar 67.

The spherical type valve 61, stem 65, and cylindrical piston member 66 are biased in a direction away from the annular valve seat 59 by a spring 68 that is interposed between the upper end of a counterbore 69 in the unloader valve casing member 57 and coaxial with the counterbore 63 and an outturned flange 70 formed on a spring seat 71 that has an internal flange 72 that rests against the upper side of the collar 67. Secured to the lower side of the collar 67 by any suitable means, such as for example brazing, is the upper end of a bellows 73 that has its lower end brazed or otherwise secured to a boss 74 formed on the interior of a cup-shaped cap member 75 that has screw-threaded engagement with external screw threads formed on the lower open end of the unloader valve casing member 57. The cup-shaped cap member 75 is provided with a central internally threaded bore 76 in which is received one threaded end of a union stud connection 77. The opposite threaded end of the union stud connection 77 is provided with a counterbore 78 that is coaxial with a bore 79 that extends through the union stud connection 77 and opens into the interior of the bellows 73. The hereinbefore-mentioned other end of the tube 52 is disposed in the counterbore 78 and is surrounded by a nut 80 that is screw threaded on the lower threaded end of the union stud connection 77. An O-ring seal 81 is disposed in an internal peripheral annular groove formed in the nut 80 which O-ring seal surrounds the tube 52 and is forced against the lower threaded end of the union stud connection 77 by the nut 80 to form a seal with the peripheral surface of the tube and thereby prevent leakage of fluid under pressure from the bore 79 along the outer surface of the tube 52 to atmosphere.

The cup-shaped cap member 75 is provided with a port 82 which serves to provide a communication between the counterbore 69 and atmosphere so that no air will be trapped and compressed within the counterbore 69 as the bellows 73 expands and contracts in a manner hereinafter described in detail.

The interior of the bellows 73 is subject to lubricant under pressure supplied by the pump 18 in a manner hereinafter described in detail. In order to prevent the supply of lubricant to the compression chamber of the compressor in the event that the bellows 73 is ruptured, the cylindrical piston member 66 is provided with a peripheral annular groove in which is disposed an O-ring seal 83.

An intake valve and discharge valve mechanism is provided in the top head 6, which valve mechanism may be identical to the intake valve and discharge valve mechanism shown and described in the hereinbefore-mentioned Patent 2,110,720, and in view of this it is deemed unnecessary to describe this valve mechanism in detail. Briefly, however, this intake and discharge valve mechanism comprises a valve seat disc 84 having a plurality of intake ports 85 extending therethrough, and a peripheral annular rib 86. An annular inlet valve disc 87 is biased by a spring 88 against the bottom side of valve seat disc 84 to close the intake ports 85, the spring 88 being interposed between the inlet valve disc 87 and a flanged collar 89. The flanged collar 89 has a hub or central stem portion 90 that passes through a central opening in the inlet valve disc 87 and has a shoulder contacting the lower face of the valve seat disc 84, and a threaded portion extending through a central threaded opening in the valve seat disc 84, which threaded portion has a lock nut 91 screw threaded thereon.

A screw plug 92, screw threaded into a screw-threaded bore 93, is adapted to secure the inlet valve mechanism in the bore 93 by pressing the peripheral rib 86 against the bottom of bore 93, the plug 92 being bored and counterbored to provide a recess or chamber 94 therein, and an outer rim, which rim fits closely around the top of the valve seat disc 84 to press it tightly against a shoulder 95 formed on the top head 6. Chamber 94 in the screw plug 92 communicates with an intake chamber 96 formed in the top head 6 through a plurality of ports 97 in the outer rim of the screw plug 92.

A cap nut 98, screwed over the exposed threads screw plug 92, serves to lock the plug in the posi shown in FIG. 1.

The discharge valve mechanism comprises a valve disc 99 having a plurality of discharge ports 100 the and a peripheral rib 101, an annular discharge valve 102 biased against the top of the valve seat disc 9! close the ports 100 therein by a spring 103 interp between the discharge valve disc 102 and a flanged cc 104. The flanged collar 104 is provided with a cer stem which passes through a central opening in the charge valve disc 102 and rest on the upper face of valve seat disc 99. A stud bolt 105 secured in a cer threaded bore in the valve seat disc 99 extends thro the annular discharge valve disc 102 and a central l in a hub portion of the flanged collar 104 and is vided with suitable nuts 106 for securing the flar collar 104 to the valve seat disc 99. The discharge p 100 in the valve seat disc 99 provide a path for the of fluid under pressure from the compressing chan above the piston 14 past the discharge valve disc 10 a discharge chamber 107 out of which leads a disch: pipe 108 that is connected to a fluid pressure sto reservoir (not shown).

A screw plug 109, screw threaded into the outer tion of a screw-threaded bore 110 in the top head adapted to secure the discharge valve mechanism wi this bore, the plug being bored to provide a chan 111 therein and an outer rim, which rim fits clo around the top of the valve seat disc 99 and contacts peripheral rib 101 to press it tightly in sealed rela against a shoulder 112 formed by the bottom of bore 110. The chamber 111 in the screw plug 109, which the flanged collar 104 extends, communicates the discharge chamber 107 through a plurality of p 113 in the outer rim of the screw plug.

A cap nut 114, similar to the cap nut 98, is scre over the exposed threads of the screw plug 109.

*Operation*

In operation, let it be assumed that the electric m or internal combustion engine which drives the c pressor is stopped, and that the fluid pressure sto reservoir to which the discharge pipe 108 is conne is at atmospheric pressure.

Let it be further assumed that while the compre is stopped, the screw plug 50 has been removed ar suitable lubricant added to the crankcase chamber 2 the lubricant level therein reaches the height show FIG. 1 of the drawings. Lubricant supplied to the cr: case chamber 2 will flow through screen 29, port 27 passageway 28 to the chamber 23 until this chambe filled with lubricant. Lubricant supplied to the cr case chamber 2 will also flow through choke 44 passageway 43 to the chamber 39 in the horizonl disposed cylindrical extension 38 of the piston cyli 24 until the level of the lubricant in the chamber is the same as that in the crankcase chamber 2. sequent to filling the crankcase chamber 2, and chambers 23 and 39 with lubricant, the plug 50 is repl in the threaded opening 49.

It will be understood that no lubricant is presen the tube 52 above the level of the lubricant in the ch ber 39. Consequently, the interior of the bellows (FIG. 3) of the unloader valve device 55 is voic lubricant. Therefore, the spring 68 is effective thrc the intermediary of spring seat 71 and collar 67 to the cylindrical piston member 66, stem 65 and sphei type valve 61 to the piston in which they are show FIG. 3 of the drawings in which position the sphei type valve 61 is unseated from the valve seat 59. the valve 61 thus unseated, the air compressing chan above the piston 14 is open to atmosphere via the l 56a, past the valve seat 59, chamber 62, counterbore and ports 64 in unloader valve casing member 57.

t it now be assumed that the electric motor or internal combustion engine which drives the compressor is ed by means of some suitable starting apparatus shown) provided for this purpose. Upon starting electric motor or internal combustion engine, the n 14 in the compressor will be reciprocated within ore 15. As the piston 14 is moved downward from ppermost or top dead center position in which it is n in FIG. 1 of the drawings, air at atmospheric ure is drawn into the compressing chamber above iston 14 from the inlet valve chamber 96 through orts 97 in the screw plug 92 and past the inlet valve 87 which is moved downward away from valve seat 84 against the yielding resistance of the spring 88 sponse to the reduction in the pressure in the coming chamber below atmospheric pressure.

hen the piston 14 reaches its lowermost dead center ion, the air compressing chamber above the piston ill be filled with air at atmospheric pressure. Therewhen the piston 14 begins its upward or compresstroke, this air will be slightly compressed to a ure sufficient to effect seating of the inlet valve disc n the valve seat disc 86 after which this air under ure will be forced from the compressing chamber e the piston 14 to atmosphere via the bore 56a, past alve seat 59, chamber 62, counterbore 63, and ports unloader valve casing member 57, before sufficient ure is developed in the compressing chamber to it the discharge valve disc 102 against the resistance ring 103.

on rotation of the crankshaft 8, the upward stroke imp piston 19 creates a vacuum or partial vacuum e piston chamber 23 whereby the static head of the lubricant in the crankcase chamber 2, as well as ir pressure acting down on a surface of the lubricant e crankcase chamber, causes fluid lubricant to be lied to the piston chamber 23 through screen 29, 27, and passageway 28, after the piston 19 uncovers assageway 28. At the same time, as hereinbefore d, a certain amount of air is admitted to the passage- 28 through the choke plug 31 and enters the piston ber 23 along with the fluid lubricant. This air is ed in the fluid lubricant admitted to the piston ber 23 so that there is a slightly compressible column e chamber 23 comprising a mixture of air and fluid cant.

the downward stroke of the piston 19, the piston oses the passageway 28 upon initial movement from osition shown in FIG. 1, and upon further moveexerts a compressive force on the mixture of air fluid lubricant trapped in the piston chamber 23 v the entrance of passageway 28 thereinto. It will bserved that the compressibility of the air comled with the fluid lubricant trapped in the piston ber 23, imparts a cushioning effect to the downward ment of the pump piston 19 so that the usual shock, noise incident thereto, of the resistance to the moveof the pump piston exerted by a homogeneous inressible column of fluid lubricant is eliminated. function of the choke plug 31 is thus to admit cushg air to the pump piston chamber 23. However, s another function and effect, as will be hereinafter ed out.

e compressive force exerted by pump piston 19 on ixture of air and fluid lubricant in the piston cham3 causes the check valve 36 to unseat and permit the re of air and fluid lubricant to flow therepast into ore 20, whence upon successive downward strokes e pump piston it is forced operatively into passage33 and 17.

the crankshaft 8 is rotating at less than a predeterd speed, there is no build up of pressure in the fluid cant system due to the fact that the centrifugally ted ball valve in the hereinbefore-mentioned speed nsive device is unseated by the pressure of the fluid lubricant which escapes from the passageway 17, as described in detail in the hereinbefore-mentioned Patent 2,110,720, into the crankcase chamber 2. On the other hand, if the crankshaft 8 rotates at a speed higher than the predetermined speed, this ball valve closes, as described in the hereinbefore-mentioned Patent 2,110,720, thus closing off the outlet of fluid lubricant from the passageway 17 and causing a buildup of fluid lubricant pressure in the bore 20 of the piston 19 from whence the lubricant will be forced through the ports 40 and 39a to the chamber 39.

As the pump 18 continues to operate, it supplies lubricant to the chamber 38 so this chamber will become filled with lubricant after which lubricant is forced from this chamber by the incoming lubricant under pressure to the interior of the bellow 73 via passageway 43, tube 52, and bore 79 in union stud 77, it being understood that lubricant under pressure is being supplied to the chamber 38 at a more rapid rate than it can flow from the passageway 43 to the crankcase chamber 2 via the choke 44.

As lubricant under pressure is supplied to the interior of the bellows 73, it is effective to expand the bellows 73 against the yielding resistance of the spring 68 and thereby move the cylindrical piston member 66, stem 65 and spherical type valve 61 in an upward direction, as viewed in FIG. 3, until the valve 61 is moved into seating contact with the valve seat 59, to cut off the unloading communication, previously described. The loading of the compressor is thus effected only after the compressor attains a predetermined speed of operation. After the compressor is thus loaded, the fluid at atmospheric pressure is drawn into the compressing chamber above the piston 14 of the compressor on each downward or suction stroke of piston 14 and is then discharged past the discharge valve disc 102 and thence to the storage reservoir via discharge chamber 107 and pipe 108 upon the corresponding compression or upward stroke of the piston 14.

Since the chamber 39, tube 52 and the interior of the bellows 73 are now completely filled with a substantially incompressible fluid lubricant under pressure, the spherical type valve 61 will be maintained constantly on its valve seat 59 against the force of compressed air supplied from the air compressing chamber above the piston 14 via the bore 56a as the piston 14 reciprocates within the bore 15, whereby hammering or chattering of the valve 61 is prevented.

As explained in the hereinbefore-mentioned Patent 2,110,720, if for any reason, such as in stopping the compressor, the speed of operation of the compressor is reduced below the above-mentioned predetermined speed, the ball valve in the speed-responsive device is unseated and fluid lubricant from passageway 17 flows into the crankcase chamber 2. The pressure of the fluid lubricant in bore 20 of the pump piston 19 and in chamber 39, tube 52 and the interior of the bellows 73 is likewise reduced, and spring 68 is rendered effective to return the cylindrical piston member 66, stem 65 and valve 61 to the position shown in FIG. 3. Upon unseating the valve 61 from its seat 59, the fluid compressed by the compressor piston 14 flows to atmosphere via bore 56a, past valve seat 59, chamber 62, counterbore 63 and ports 64 in unloader valve casing member 57 and the compressor is thereby unloaded.

It will be understood from the foregoing that if the tube 52 or bellows 73 is ruptured or the lubricant pressure in the interior of the bellows 73 is lost from any cause, the spring 68 will be rendered effective to move the cylindrical piston member 66, stem 65 and spherical type valve 61 to the position shown in FIG. 3, whereupon the fluid compressed by the compressor flows to atmosphere and the compressor is thereby unloaded.

Figure 4:
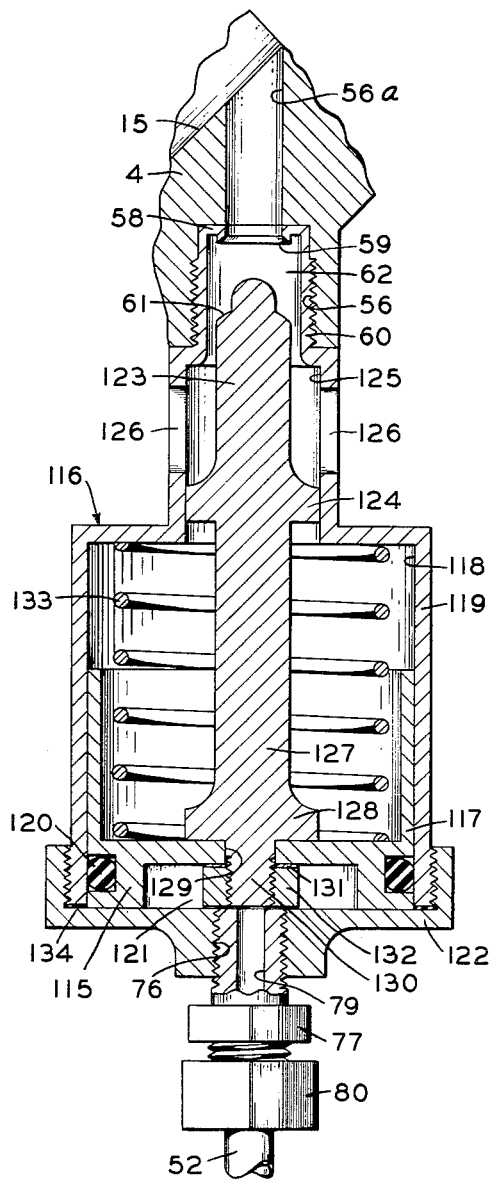
FIG. 4 is a vertical view, showing a second embo[di]ment of an unloading valve device similar to that [of] FIG. 3 but in which a piston actuates the unloader val[ve]

*Description—FIG. 4*

According to a second embodiment of the invention, a piston 115 which is shown in detail in FIG. 4, replaces the bellows 73 shown in FIG. 3 to provide an unloader valve device 116 than functions substantially the same as the unloader valve device 55 shown in FIG. 3. Accordingly, like reference numerals have been used to designate the structure shown in FIG. 4 which is identical with that shown in FIG. 3 and already described. Only such features of the structure and operation of the embodiment of FIG. 4 which differ from that of the embodiment of FIG. 3 will be hereinafter described.

According to the embodiment of the invention shown in FIG. 4, the unloader valve device 116 comprises the piston 115, which replaces the bellows 73 shown in FIG. 3. The piston 115 is provided with a skirt position 117 that is slidably mounted in a counterbore 118 of an unloader valve casing member 119. The piston 115 is also provided with a peripheral annular groove in which is disposed an O-ring seal 120 that is effective to form a seal with the wall of counterbore 118 to prevent leakage of fluid under pressure from a pressure chamber 121 formed at the lower side of the piston 115 by the cooperative relation of the piston 115 and a cup-shaped cap member 122 that has screw-threaded engagment with external screw threads formed on the lower open end of the unloader valve casing member 119.

The upper end of the unloader valve casing member 119 is identical to the unloader valve casing member 57 in that it is provided with an inturned flange 58, an annular valve seat 59, and a screw-threaded hollow cylindrical portion 60 this screw threaded into the threaded counterbore 56 in the cylinder section 4 of the compressor.

Disposed within the chamber 62 in the hollow cylindrical portion 60 is the spherical type valve 61 that is connected by a stem 123 slightly longer than the stem 65 to a cylindridal piston member 124 that is slidably mounted in a counterbore 125 formed in the unloader valve casing member 119. The cylindrical piston member 124 shown in FIG. 4 differs from the cylindrical piston member 66 shown in FIG. 3 in that it is not provided with an O-ring seal corresponding to the O-ring seal 83 shown in FIG. 3. The O-ring seal 120 carried by the piston 115 forms a seal with the wall of the counterbore 118 to prevent the lubricant under pressure supplied to the chamber 121 from flowing to atmosphere via the counterbores 118 and 125 and a plurality of ports 126 provided in the wall of the counterbore 125. Hence, there is no necessity to provide the cylindrical piston member 124 with an O-ring seal.

Extending from the lower end of the cylindrical piston member 124 is a stem 127 that has formed near its lower end a flange 128 that abuts the upper face of the piston 115. Extending from the lower side of the flange 128 and through a central bore 129 in piston 115 is a screw-threaded portion 130 formed integral with the flange 128 and adapted to receive a washer 131 and a nut 132 that rigidly secures the piston 115 to the stem 127.

The spherical type valve 61, stem 123, cylindrical piston member 124, stem 127, and piston 115 are normally biased in a direction away from the valve seat 59 and to the position shown in FIG. 4 in which the piston 115 abuts cap member 122 by a spring 133 that is interposed between the upper end of the counterbore 118 and the upper face of the piston 115.

A gasket 134 is interposed between the cup-shaped cap member 122 and the lower end of the unloader valve casing member 119 to provide a seal therebetween, and prevent leakage of lubricant under pressure from the pressure chamber 121 to atmosphere.

The operation of the unloader valve device 116 is substantially the same as that of the unloader valve device 55. Hence, a detailed description of the operation of the unloader valve device 116 is not deemed necessary.

It will be understood that a fluid compressor of the type shown and described in the hereinbefore-mentioned Crittenden patent can be readily and inexpensively converted to embody either embodiment of the novel unloading device of the present invention by means of a conversion kit containing the hereinafter-described necessary new parts for effecting the conversion.

Existing fluid compressors constructed in accordance with the Crittenden patent can be converted to embody either of the unloader valve devices 55 or 116 of the present invention by means of a conversion kit comprising the piston cylinder 24, the end section 5, a gasket seal 136 (FIG. 1) to be disposed between the end section 5 and the right-hand end of the crankcase section 1, plurality of cap screws 48 for securing the end section 5 to the crankcase section 1, an adapter fitting 45, a nut 137, a gasket seal 138 (FIG. 2) to be disposed between the nut 137 and the right-hand end of the end section when the nut 137 is screwed onto the threaded portion of the adapter fitting 45, an unloader valve device constructed either as the unloader valve device 55 shown FIG. 3 or as unloader valve device 116 shown in FIG. a tube 52 for connecting the unloader valve device to the threaded portion 47 of the adapter fitting 45, a nut 54 which has been assembled an O-ring seal 53, and a nut 80 to which has been assembled an O-ring seal 81, the nuts and their respective O-ring seals being for the purpose of forming a seal with the respective opposite ends of the tube 52 and connecting these ends to the adapter fitting 45 and the unloader valve 55 or 116 respectively.

It will be apparent to a mechanic which items must be removed from an existing compressor and replaced with items from the conversion kit in order to convert existing compressor so that it embodies the present invention. Therefore a detailed description of the disassembly of the compressor and the subsequent reassembly using the parts in the conversion kit is not deemed necessary.

Having now described the invention, what I claim new and desire to secure by Letters Patent is:

1. A fluid compressor unloader mechanism conversion kit for a fluid compressor having a casing providing crankcase chamber and a compressing chamber, said casing having a cylinder wall through which a passageway extends from the discharge end of the compression chamber to the exterior of the cylinder wall, a crankshaft rotatable in said crankcase, and a pump operated by the crankshaft for supplying hydraulic fluid lubricant under pressure to the bearings of the compressor, said conversion kit comprising:

(a) a pump piston cylinder having a chamber for receiving hydraulic lubricant under pressure, and hollow boss through which hydraulic lubricant can be discharged from the chamber, (b) an adapter fitting having an O-ring seal for encircling the hollow boss to form a rotary seal therewith, (c) a hydraulic fluid lubricant pressure operated unloader valve device provided with means whereby can be secured to the cylinder wall at the exterior end of the passageway through the cylinder wall, a (d) conduit means for connecting said adapter fitting to said hydraulic fluid lubricant pressure operated unloader valve device whereby said unloader valve device is operated by variations in the pressure hydraulic fluid lubricant supplied by the pump to the bearings of the compressor.

2. A fluid compressor unloader mechanism conversion kit, as claimed in claim 1, further characterized in that said hydraulic fluid lubricant pressure operated unloader valve device comprises:

(a) a tubular valve housing secured to the cylinder wall at the exterior end of the said passageway which valve housing has a port therein that opens the said passageway to atmosphere and is provided with an annular valve seat on the interior thereof interposed between the exterior end of the passageway and said port, (b) a valve operable to seat on the annular valve seat to close communication between the passageway and atmosphere to load the compressor,
(c) a valve stem connected at one end to said valve,
(d) a movable abutment operatively connected to the opposite end of said valve stem,
(e) a spring means interposed between said movable abutment and said valve housing yieldingly inhibiting seating of said valve on the annular valve seat until fluid pressure active on said abutment exceeds a chosen value, and
(f) conduit means connecting the pump to the movable abutment through which hydraulic fluid lubricant under pressure is supplied from said pump to said movable abutment to effect movement thereof in the direction to overcome the yielding resistance of said spring means and to move said valve into seating contact with the annular valve seat and to maintain said valve constantly in seated contact with the annular valve seat without chattering so long as the fluid lubricant pressure active on the said movable abutment exceeds said chosen value.

A fluid compressor unloader mechanism conversion as claimed in claim 1, further characterized in that hydraulic fluid lubricant pressure operated unloader e device comprises:

(a) a tubular valve housing secured to the cylinder wall at the exterior end of the said passageway, which valve housing has a port therein that opens the said passageway to atmosphere and is provided with an annular valve seat on the interior thereof interposed between the exterior end of the passageway and said port,
(b) a valve operable to seat on the annular valve seat to close communication between the passageway and atmosphere to load the compressor,
(c) a valve stem connected at one end to said valve and having an annular collar at its other end,
(d) a bellows having one end sealingly secured to the annular collar at the other end of said valve stem and the other end sealingly anchored to said valve housing,
(e) spring means interposed between the one end of said bellows and said valve housing yieldingly inhibiting seating of said valve on the annular valve seat by said bellows until the fluid pressure active on said bellows exceeds a chosen value, and
(f) conduit means connecting the pump to the interior of said bellows through which hydraulic fluid lubricant under pressure is supplied from said pump to the interior of said bellows to effect expansion of said bellows in the direction to overcome said spring means and to move said valve into seating contact with the annular valve seat and to maintain said valve constantly in seated contact with the annular valve seat without chattering so long as the fluid lubricant pressure active on said bellows exceeds said chosen value.

4. A fluid compressor unloader mechanism conversion kit for a fluid compressor having a casing providing a crankcase chamber and a compressing chamber, said casing having a cylinder wall through which a passageway extends from the discharge end of the compressing chamber to the exterior of the cylinder wall, a crankshaft rotatable in said crankcase, and a pump operated by the crankshaft for supplying hydraulic fluid lubricant under pressure to the bearings of the compressor, said conversion kit comprising:

(a) a pump piston cylinder having a chamber for receiving hydraulic lubricant under pressure, and a hollow boss through which hydraulic lubricant can be discharged from the chamber,
(b) an adapter fitting having an O-ring seal for encircling the hollow boss to form a rotary seal therewith and an elongated threaded portion at one end and a flange at the other,
(c) an end section member for closing one end of the crankcase chamber of the compressor, said end section member having a hollow boss through which the elongated threaded portion of said adapter fitting extends,
(d) a nut having screw-threaded engagement with the elongated threaded portion of said adapter fitting for securing said end section against the flange of said adapter fitting whereby said end section effects support of said adapter fitting,
(e) a hydraulic fluid lubricant pressure operated unloader valve device provided with means whereby it can be secured to the cylinder wall at the exterior end of the passageway through the cylinder wall, and
(f) conduit means for connecting the elongated threaded portion of said adapter fitting to said hydraulic fluid lubricant pressure operated unloader valve device whereby said unloader valve device is operated by variations in the pressure of hydraulic fluid lubricant supplied by the pump to the bearings of the compressor.

References Cited by the Examiner

UNITED STATES PATENTS

| 1,922,092 | 8/33 | Hull | 230—29 |
| 2,007,388 | 7/35 | Tarleton | 230—22 |
| 2,011,220 | 8/35 | Henning | 251—61.1 |
| 2,017,684 | 10/35 | Crittenden | 230—27 |
| 2,042,085 | 5/36 | Aikman | 230—27 |
| 2,110,720 | 3/38 | Crittenden | 230—30 |
| 2,158,715 | 5/39 | Beekley et al. | 251—61.1 |
| 2,164,405 | 7/39 | Hintze | 230—24 |
| 2,265,675 | 12/41 | Stewart | 230—22 |

FOREIGN PATENTS

| 42,073 | 4/30 | Denmark. |
| 829,060 | 2/60 | Great Britain. |
| 130,819 | 2/51 | Sweden. |

LAURENCE V. EFNER, *Primary Examiner.*